(12) United States Patent
Yamamoto et al.

(10) Patent No.: US 6,860,467 B2
(45) Date of Patent: Mar. 1, 2005

(54) ELECTROMAGNETIC VALVE

(75) Inventors: Shigeharu Yamamoto, Kariya (JP); Shigeki Niimi, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 156 days.

(21) Appl. No.: 10/154,914

(22) Filed: May 28, 2002

(65) Prior Publication Data

US 2002/0185623 A1 Dec. 12, 2002

(30) Foreign Application Priority Data

May 25, 2001 (JP) ........................................ 2001-157849

(51) Int. Cl.[7] .............................................. F16K 31/02
(52) U.S. Cl. .............................................. 251/129.15
(58) Field of Search ................ 251/129.15; 137/625.65, 137/625.69, 315.03; 335/278, 281; 29/606

(56) References Cited

U.S. PATENT DOCUMENTS

| | | | | |
|---|---|---|---|---|
| 3,661,183 A | * | 5/1972 | Komaroff et al. | 137/625.65 |
| 4,809,749 A | * | 3/1989 | Ichihashi | 137/625.65 |
| 5,467,962 A | * | 11/1995 | Bircann et al. | 251/129.15 |
| 5,509,439 A | * | 4/1996 | Tantardini | 137/269 |
| 6,179,005 B1 | * | 1/2001 | Inami | 137/625.65 |
| 6,206,343 B1 | * | 3/2001 | Kato et al. | 251/129.15 |
| 6,501,359 B2 | * | 12/2002 | Matsusaka et al. | 335/278 |
| 6,564,443 B2 | * | 5/2003 | Oishi et al. | 29/596 |

FOREIGN PATENT DOCUMENTS

| | | |
|---|---|---|
| DE | 34 18 654 C2 | 5/1984 |
| JP | 10-299932 | 4/1997 |

OTHER PUBLICATIONS

Office action letter dated Jul. 21, 2003 for corresponding German patent application with English translation.

* cited by examiner

Primary Examiner—Eric Keasel
(74) Attorney, Agent, or Firm—Reed Smith LLP; Stanley P. Fisher, Esq.; Juan Carlos A. Marquez, Esq.

(57) ABSTRACT

An electromagnetic valve comprises a first yoke member having an approximately cylindrical shape, a second yoke member having an approximately cylindrical shape and being disposed so as to be opposite to the first yoke member, a bobbin being molded by resin so as to surround the first yoke member and the second yoke member and being integral with the first yoke member and the second yoke member, a plunger being fitted into the first yoke member and the second yoke member so as to be movable in the axial direction, a valve member being moved by the plunger, and a plug member disposed between the opposite surfaces of the first and second yoke members.

11 Claims, 2 Drawing Sheets

ELECTROMAGNETIC VALVE

The present application is based on and claims priority under 35 U.S.C. § 119 with respect to Japanese Patent application No. 2001-157849 filed on May 25, 2001, the entire content of which is incorporated herein by reference.

FIELD OF THE INVENTION

The present invention relates to an electromagnetic valve.

BACKGROUND OF THE INVENTION

A conventional electromagnetic valve of this kind is disclosed, for example, in Japanese Laid-open Publication No. 10-299932. This valve includes a first yoke member which has an approximately cylindrical shape, a second yoke member which has an approximately cylindrical shape and which is disposed so as to be opposite to the first yoke member, a bobbin which is molded by resin so as to surround the first yoke member and the second yoke member and which is integral with the first yoke member and the second yoke member, a plunger which is fitted into the first yoke member and the second yoke member so as to be slidable with respect to the bobbin and a valve member which is moved by the plunger.

In the above prior valve, when the first yoke member and the second yoke member are molded with the bobbin by insert molding, at first a molding pin is fitted into inner bores of the first and second yoke members which are opposite each other in the axial direction and the first and second yoke members with the molding pin are put into a cavity of molds. In this condition, a first space between the outer circumferences of the first and second yoke members and an inner surface of the cavity of the mold and a second space between the inner circumferences of the first and second yoke members and an outer circumference of the molding pin are communicated with each other through a circular gap which is formed between an end surface of the first yoke member and an end surface of the second yoke member being opposite to the end surface of the first yoke member. Next, resin is filled in the first space and the first and second yoke members are integral with the bobbin by insert molding. In this condition, the resin is apt to flow out from the first space to the second space through the circular gap and a resin flash is apt to be formed on the inner circumferences of the first and second yoke members. If the resin flash is dropped out during the operation of the electromagnetic valve, the sliding movement of the plunger is disturbed.

SUMMARY OF THE INVENTION

It is, therefore, a principal object of the present invention to provide an improved electromagnetic valve which overcomes the above drawback. In order to attain the foregoing object, the present invention provides an electromagnetic valve which includes a first yoke member having an approximately cylindrical shape, a second yoke member having an approximately cylindrical shape and being disposed so as to be opposite to the first yoke member, a bobbin being molded by resin so as to surround the first yoke member and the second yoke member and being integral with the first yoke member and the second yoke member, a plunger being fitted into the first yoke member and the second yoke member so as to be movable in the axial direction, a valve member being moved by the plunger and a plug member disposed between the opposite surfaces of the first and second yoke members.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which.

DETAILED DESCRIPTION OF THE PRESENT INVENTION

Figure 1:
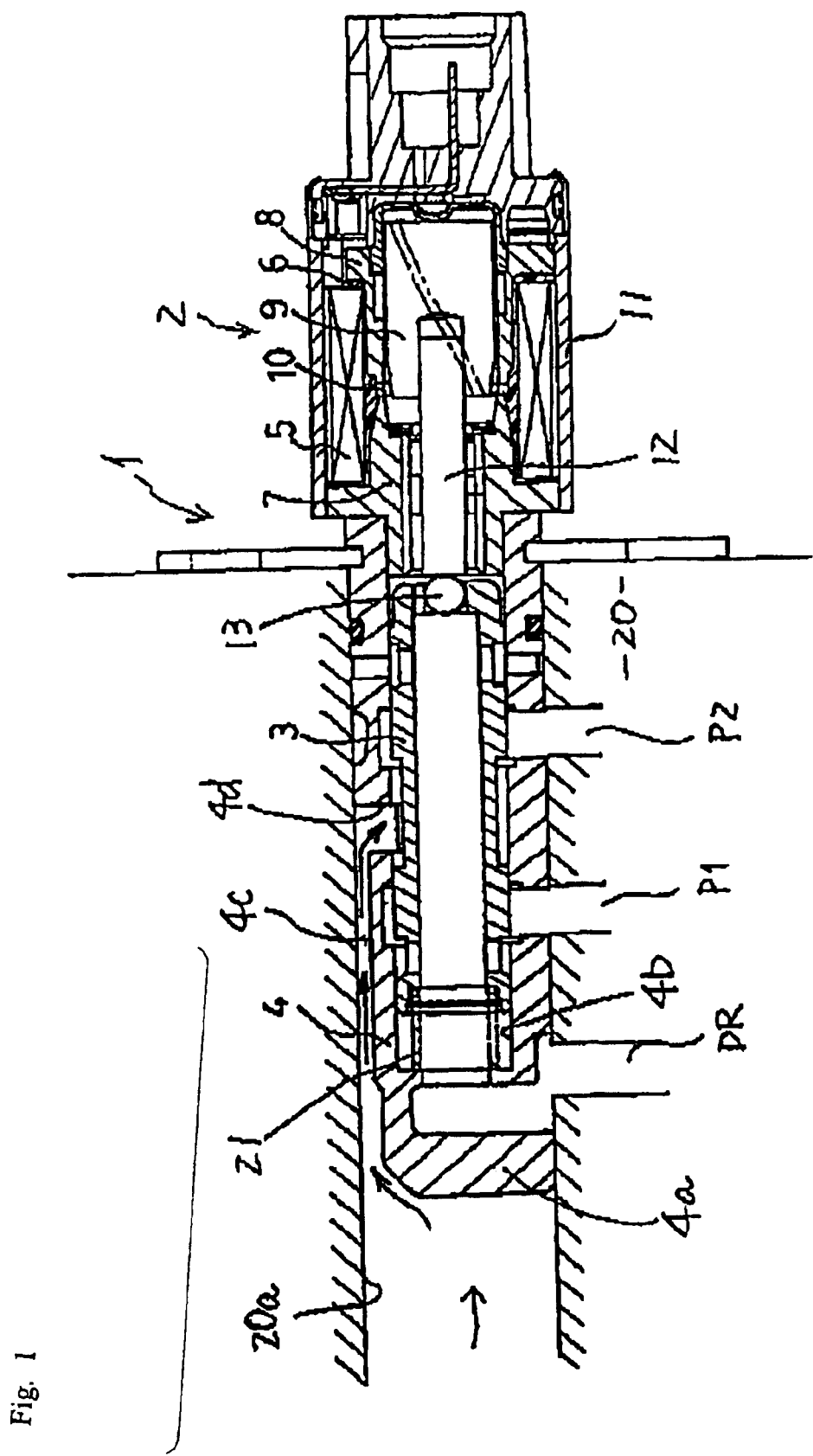
FIG. 1 is a cross-sectional view of an electromagnetic valve according to an embodiment of the present invention.

A preferred embodiment of the present invention is illustrated in FIG. 1. An electromagnetic valve 1 shown in FIG. 1 is a linear type electromagnetic valve. This valve is used to control the pressure or the flow rate of the fluid which is used for controlling a subject of the control such as, for example, a valve timing control device or a vehicular automatic transmission and so on.

Referring to FIG. 1, the electromagnetic valve 1 includes a electromagnetic mechanism 2, a spool 3 which is moved by the electromagnetic mechanism 2 and a cylindrical sleeve 4 in which the spool 3 is disposed so as to be able to slide in the axial direction. The electromagnetic mechanism 2 includes a first yoke member 7 which has an approximately cylindrical shape and which is made of magnetic material, a second yoke member 8 which has an approximately cylindrical shape and which is made of magnetic material, a cylindrical bobbin 6 which is made of resin, a coil 5 which is wound on the bobbin 6, a cover 11 which is made of magnetic material, a plunger 9 which is made of magnetic material and which is movable in the axial direction by electromagnetic force, and a circular plug member 10 which is made of non-magnetic material.

The sleeve 4 has an approximately cylindrical shape and is provided with an inner bore 4b. The first yoke member 7 is snugly fitted into an end opening portion of the inner bore 4b. A block portion 4a is formed on the other end of the sleeve 4 and the other end opening of the inner bore 4b is opposite to the block portion. The sleeve 4 is fitted into a bore 20a which is formed on a cylinder block 20 of an engine. The bore 20a is communicated to a hydraulic pump (not shown) and is also communicated to fluid passages P1, P2 which are communicated to the hydraulic actuator such as a variable valve timing control device (not shown) and a drain passage DR. The spool 3 is slidably fitted into the inner bore 4b and is normally urged toward the electromagnetic mechanism 2 by a spring 21. The spool 3 has a hollow shape and a ball 13 is connected to an end opening portion of the spool 3. The ball 13 is always contacted with an end of a shaft 12 whose other end is connected to the plunger 9. Accordingly, the spool 3 is moved in response to the movement of the plunger 9 and switches the fluid communication between the hydraulic pump (not shown) and the passages P1 or P2 and the fluid communication between the drain passage DR and the passages P1 or P2. In this embodiment, the hydraulic fluid from the hydraulic pump (not shown) is supplied to one of the passages P1 or P2 through the bore 20a, an axial groove 4c and an inlet port 4d formed on the sleeve 4. The block portion 4a prevents the spool 3 from receiving the hydraulic pressure from the hydraulic pump (not shown) through the bore 20a and the other end opening portion of the inner bore 4b of the sleeve 4.

The second yoke member 8 is disposed so as to be opposite to the first yoke member 7. The bobbin 6 is molded by resin so as to surround the first yoke member 7 and the second yoke member 8 and is integral with the first yoke member 7 and the second yoke member 8 by insert molding the first and second yoke members 7, 8. The plug member 10 is disposed between the opposite surfaces of the first and second yoke members 7, 8.

Figure 2:
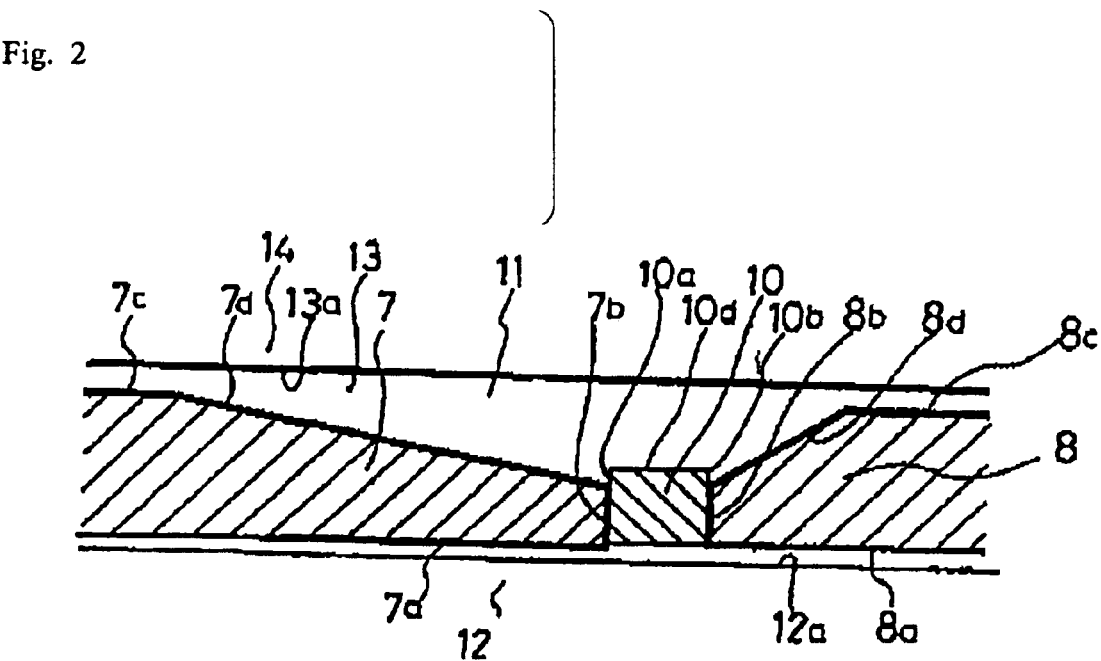
FIG. 2 is a partly enlarged cross-sectional view of the electromagnetic valve of the embodiment before a bobbin is molded.

Next, how to mold the bobbin 6 is described with reference to FIGS. 2 and 3. FIG. 2 shows a condition in which the bobbin is not yet molded. As shown in FIG. 2, at first, a molding pin 12 is fitted into inner bores of the first and second yoke members 7, 8 which are opposite each other in the axial direction and the first and second yoke members 7, 8 with the molding pin 12 are put into a cavity 13 of mold 14. In this condition, the plug member 10 is disposed between the opposite surfaces of the first and second yoke members 7, 8 so that the plug member 10 is in contact with the first and second members 7, 8. Namely, a left side surface 10a of the plug member 10 contacts with a right side surface 7b of the first yoke member 7, and the right side surface 10b of the plug member 10 is in contact with a left side surface of the second yoke member 8. The plug member 10 is made of deformable nonmagnetic material such as aluminum. The radial width of the right side surface 7b of the first yoke member 7 and the left side surface 8b of the second yoke member 8 is smaller than the radial width of both sides of the plug member 10. The inner circumference of the plug member 10 coincides with the inner circumferences of the first and second yoke members 7, 8. A conical surface 7d is formed between the right side surface 7b and the outer circumference surface 7c of the first yoke member 7. A conical surface 8d is formed between the left side surface 8b and the outer circumference surface 8c of the second yoke member 8.

Figure 3:
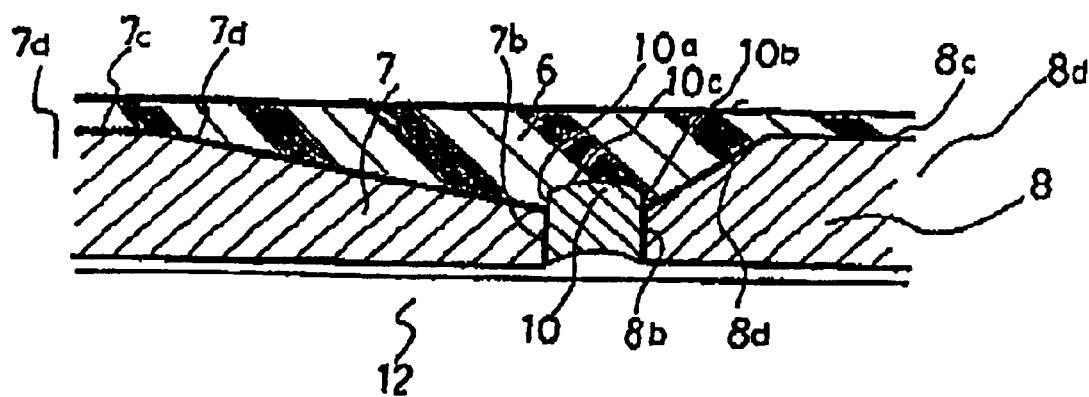
FIG. 3 is a partly enlarged cross-sectional view of the electromagnetic valve of the embodiment after the bobbin is molded.

Then, as shown in FIG. 3, resin is filled in a space 11 between the outer circumferences of the first and second yoke members 7, 8 and an inner surface of the cavity 13a of the mold 13 and the first and second yoke members 7, 8 are integral with the bobbin 6 by insert molding. Before the resin is molded, the first and second yoke members 7, 8 receive a compressive force by molds (not shown) so as to compress the plug member 10 therebetween. Thereby, as shown in FIG. 3, the plug member 10 deforms outwardly and the both side surfaces 10a, 10b of the plug member 10 are pressed to the opposite surfaces 7b, 8b of the first and second yoke members 7, 8. Thereby, the space 11 between the outer circumferences of the first and second yoke members 7, 8 and an inner surface of the cavity 13a of the mold 13 is isolated from a space between the inner circumferences of the first and second yoke members 7, 8 and an outer circumference 12a of the molding pin 12. As a result, the resin is prevented from flowing out to the space between the inner circumferences of the first and second yoke members 7, 8 and the outer circumference 12a of the molding pin 12. Thereby, deterioration of the operation of the electromagnetic valve 1 by resin flash is avoided.

The invention has thus been shown and described with reference to a specific embodiment; however, it should be understood that the invention is in no way limited to the details of the illustrated structures but changes and modifications may be made without departing from the scope of the appended claims.

What is claimed is:

1. An electromagnetic valve, comprising:
   a first yoke member having an approximately cylindrical shape;
   a second yoke member having an approximately cylindrical shape and being disposed opposite to the first yoke member;
   a bobbin molded by resin surrounding the first yoke member and the second yoke member and integral with the first yoke member and the second yoke member;
   a plunger fitted into the first yoke member and the second yoke member movable in an axial direction;
   a valve member moved by the plunger, and
   a plug member disposed between opposite surfaces of the first yoke member and second yoke members, and made of mechanically deformable non-magnetic material, wherein
   an axial length of the plug member is larger than a clearance between the first yoke member and the second yoke member such that the plug member is mechanically deformed in response to being fitted in position between the first yoke member and the second yoke member.

2. An electromagnetic valve as set forth in claim 1, wherein the plug member has a circular shape; and
   wherein a radial width of said plug member is larger than a radial width of the opposite surfaces of the first yoke member and second yoke member.

3. An electromagnetic valve according to claim 1, wherein the plug member receives compressing strength from the first and second members.

4. An electromagnetic valve according to claim 3, wherein the plug member deforms in response to the compressing strength from the first and second members.

5. An electromagnetic valve according to claim 4, wherein the plug member deforms in a radially outward direction of the electromagnetic valve.

6. An electromagnetic valve comprising:
   a first yoke member having an approximately cylindrical shape;
   a second yoke member having an approximately cylindrical shape and being disposed opposite to the first yoke member;
   a bobbin surrounding the first yoke member and the second yoke member;
   a plunger fitted into the first yoke member and the second yoke member movable in an axial direction;
   a valve member moved by the plunger; and
   a plug member disposed between opposite surfaces of the first yoke member and second yoke member and made of deformable non-magnetic material, wherein
   the plug member is being deformed by pressing the first yoke member and second yoke member therebetween, and a resin material forming the coil bobbin is prevented from leading from a junction, and
   an axial length of the plug member is larger than a clearance between the first yoke member and the second yoke member such that the plug member is mechanically deformed in response to being fitted in position between the first yoke member and the second yoke member.

7. An electromagnetic valve according to claim 6, wherein the plug member receives compressing strength from the first and second members.

8. An electromagnetic valve according to claim 7, wherein the plug member deforms in response to the compressing strength from the first and second members.

9. An electromagnetic valve according to claim 8, wherein the plug member deforms in a radially outward direction of the electromagnetic valve.

10. An electromagnetic valve according to claim 7, wherein the plug member mechanically deforms in response to the compressing strength from the first and second members.

11. An electromagnetic valve according to claim 10, wherein the plug member deforms in a radially outward direction of the electromagnetic valve.

* * * * *